E. ABORN.
COFFEE PERCOLATOR.
APPLICATION FILED JAN. 6, 1911.
1,005,096.
Patented Oct. 3, 1911.
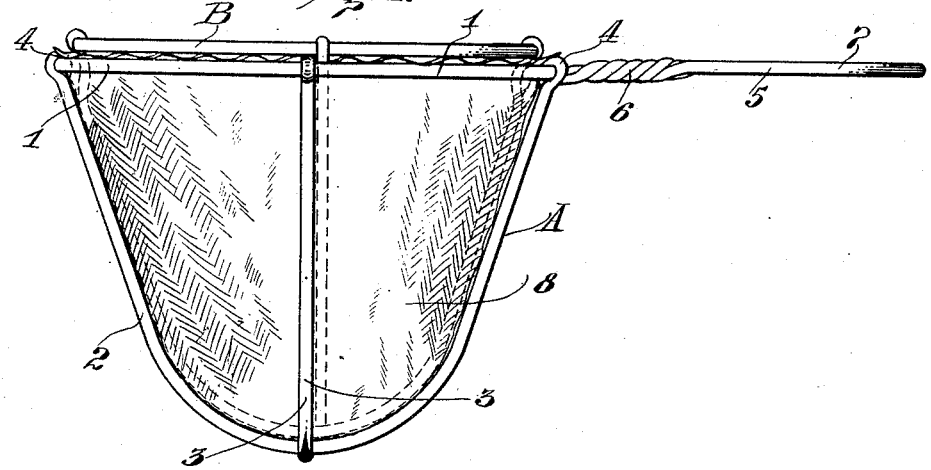
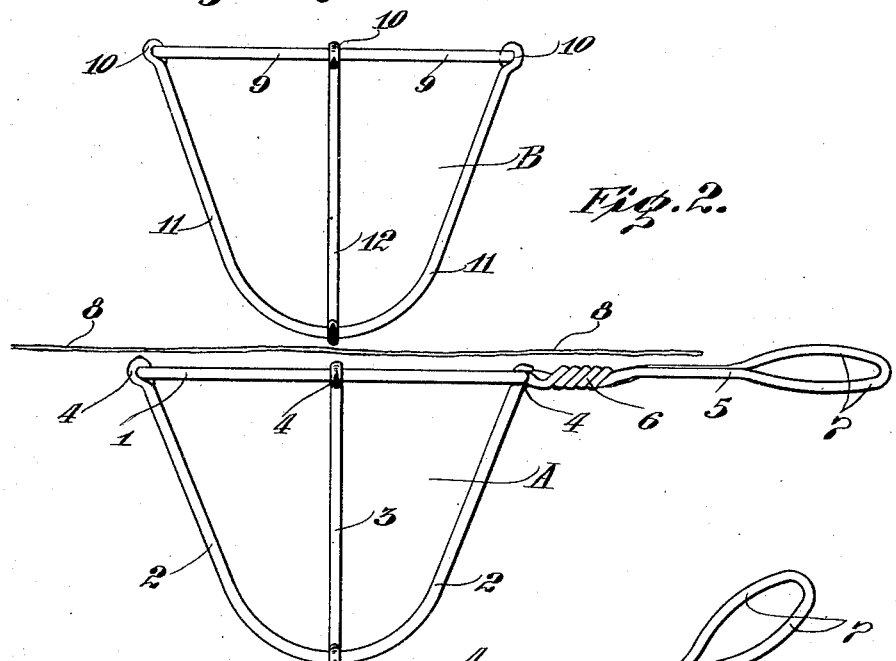
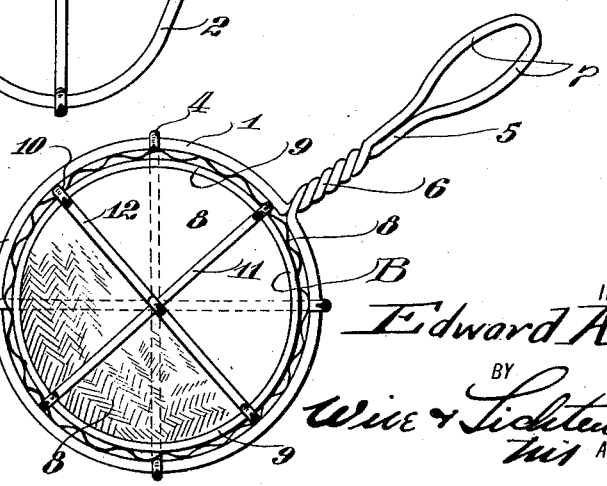
WITNESSES
G. Guneer.
J. Baumgart.
INVENTOR
Edward Aborn
BY
Wise & Lichtenstein
his ATTORNEYS

UNITED STATES PATENT OFFICE.

EDWARD ABORN, OF EAST ORANGE, NEW JERSEY.

COFFEE-PERCOLATOR.

1,005,096.  Specification of Letters Patent.  Patented Oct. 3, 1911.

Application filed January 6, 1911. Serial No. 601,080.

*To all whom it may concern:*

Be it known that I, EDWARD ABORN, a citizen of the United States, residing at East Orange, in the county of Essex and State of New Jersey, have invented certain new and useful Improvements in Coffee-Percolators, of which the following is a specification.

This invention relates to improvements in coffee percolators, and its object has been to provide a percolator which shall be simple, hygienic and capable of efficiently making coffee containing only the desirable elements of the coffee bean, and to such ends my invention consists in the coffee percolator hereinafter specified.

In the accompanying drawings—Figure 1 is a side elevation of the preferred embodiment of my invention. Fig. 2 is a side elevation of Fig. 1, showing the parts separated but in position to be assembled. Fig. 3 is a plan view of Fig. 1.

As nearly universal as the making of coffee is, I have found the conditions necessary to make the best coffee are but little understood. It is necessary that the water be in contact with the coffee but an exceedingly brief time, in fact, just long enough for the water to run through the ground coffee, as, otherwise, undesirable elements in the coffee are taken up by the water in addition to the desirable elements. Therefore, a certain rate and freedom of flow of the water through the coffee is important. It should be possible to maintain the desirable rate of flow whether a large or a small quantity of coffee is being made. Coffee has a chemical action upon metal, and it is therefore desirable to prevent its coming in contact with metal and especially the metal in the form of a sieve, since the amount of surface exposed in a sieve is so large as to facilitate a relatively large amount of chemical action. If the best coffee is to be made, great cleanliness must be observed. It is impossible to keep a sieve perfectly clean, and thus, for this reason also, it is desirable to avoid the use of a sieve. So far as known to me, all percolators previous to mine violate one or the other of these conditions.

The percolator which I have invented consists, essentially, of an outer frame having a handle, and an inner frame adapted to be placed within the outer frame, each of such frames having arms, which are adapted to hold a plain piece of cloth passed between them in a relatively deep bag-form. In the illustrated embodiment, the outer frame consists of a ring 1, having a handle 2, the ring and handle being preferably formed out of a single piece of wire. An arm or loop 2 of wire is fastened to the ring at each of its ends. A second arm or loop 3 is arranged in the same way transverse to the loop 2. The inner frame consists of a ring having loops 11 and 12 crossing each other. The filter cloth 9 may be a plain piece of cloth, and does not require any cutting or sewing into bag-form. In use, the cloth is laid over the outer frame, and the inner frame is forced down to place within the outer frame, which action brings the cloth into bag-form. The ground coffee is put in the bottom of the bag and the water, preferably actually boiling, is poured through the coffee.

It will be observed that my coffee percolator has, among others, the following advantages: The water flows freely through the coffee, and is in contact with it only long enough to extract the desirable coffee flavor, and does not extract the undesirable acid. The bag being deep, the coffee can be arranged in a layer of such a depth that the single pouring of the water through it will make coffee of the desired strength, for it is undesirable to pour the water through the coffee a second time. The shape of the bag is such that the distance the water travels in reaching the filter cloth is substantially the same whether there be much, or little, ground coffee in the bag, and thus substantially a uniform rate of flow can be obtained whether the quantity of coffee being made is large or small. There is a minimum of metal to come in contact with the coffee, and such as it is, exposes a minimum of surface to the chemical action. No sieve is used. There is no sheet metal in contact with the cloth, either to interfere with the free flow of the water or to be subjected to chemical action. The metal construction is so simple that it is easy to keep it substantially perfectly clean. The cloth being plain, and not made up into bag-form, is of such a shape that it can most readily be cleaned. It is desirable that the cloth be perfectly clean every time coffee is made. As the cloth requires no labor to prepare it for use in my percolator, it can be renewed frequently at a trifling expense. As the bag is relatively deep and tapering, the tendency of water is to follow the bag to its lowest point before dropping from the bag, and this enables the percolator to be used in making coffee directly into a cup, whether or not the cup be smaller than the rings of the percolator, and yet the same percolator may be used for making coffee in a pot.

My percolator enables one to make a single cup of coffee as perfectly as a larger quantity, and to make that coffee directly into a cup without first passing it through a coffee-pot, which is a most attractive way to make coffee.

I claim—

In a coffee percolator, the combination of an outer frame and an inner frame, said frames each comprising a ring and depending arms widely separated and formed of wire, said outer frame having a handle, said inner frame being smaller at any given level than said outer frame, and a piece of fabric, said frames being adapted to engage the fabric between them and hold it in the form of a bag having a rounded lower end, said percolator being without metal sieves or sheet metal in contact with the portion of said fabric used for filtering.

In testimony whereof I have hereunto signed my name in the presence of two subscribing witnesses.

EDWARD ABORN.

Witnesses:
WILSON A. M. WATSON,
JOHN H. BEATTY.

Copies of this patent may be obtained for five cents each, by addressing the "Commissioner of Patents, Washington, D. C."